United States Patent
Getzinger

(10) Patent No.: US 7,457,915 B2
(45) Date of Patent: Nov. 25, 2008

(54) INTELLIGENT MEDIA CACHING BASED ON DEVICE STATE

(75) Inventor: Thomas W. Getzinger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 11/102,605

(22) Filed: Apr. 7, 2005

(65) Prior Publication Data

US 2006/0230229 A1 Oct. 12, 2006

(51) Int. Cl.
*G06F 13/00* (2006.01)

(52) U.S. Cl. ........................................ 711/113; 711/118

(58) Field of Classification Search ........................ None
See application file for complete search history.

(56) References Cited

U.S. PATENT DOCUMENTS

| | | | |
|---|---|---|---|
| 6,934,812 B1 * | 8/2005 | Robbin et al. ............... | 711/138 |
| 2002/0032019 A1 * | 3/2002 | Marks et al. ................ | 455/414 |
| 2004/0138948 A1 * | 7/2004 | Loomis ........................ | 705/14 |
| 2004/0203576 A1 * | 10/2004 | Droste et al. ............. | 455/404.1 |
| 2005/0071881 A1 * | 3/2005 | Deshpande ................... | 725/88 |
| 2006/0155400 A1 * | 7/2006 | Loomis ........................ | 700/94 |

* cited by examiner

*Primary Examiner*—Than Nguyen
(74) *Attorney, Agent, or Firm*—Lee & Hayes, PLLC

(57) ABSTRACT

A portable media device intelligently caches media based on device state. The portable media device has a hard disk memory to store the media (e.g., music, videos, movies, games, etc.) and a cache memory. When the device is in a state of user interaction (e.g., the user is navigating a menu or playlist, the user interface is unlocked, and so forth), the portable media device caches many snippets of different media items in a playlist. This enables the device to respond quickly to user input and provide instant playback as the user navigates items in the playlist. Conversely, when the device is in a playback state (e.g., the user has ceased interacting with the device for a period of time, or has locked the user interface), the portable media device caches as much contiguous data from the selected media item in the playlist as possible.

15 Claims, 5 Drawing Sheets

INTELLIGENT MEDIA CACHING BASED ON DEVICE STATE

TECHNICAL FIELD

This disclosure relates to portable media devices and techniques for operating portable media devices.

BACKGROUND

Portable media devices are commonplace and widespread in their use. These devices allow users to store and play movies, music, video games, and other types of media. The devices come in many shapes and configurations, and offer a wide variety of functionality. Some portable media devices are dedicated to a particular function, such as music players (e.g., MP3 players) and personal video players. Others support multiple functions, such as cellular phones and PDAs (portable digital assistants) that are additionally configured to store and playback music or videos.

Portable media devices are commonly equipped with solid state memory (e.g. non-volatile RAM (random access memory) or flash memory) to store the media. However, these devices are limited in the amount of media that can be stored. To increase storage capacity, portable media devices can be equipped with hard disk memory that is capable of holding large quantities of media, such as full-length movies and music libraries. The drawback of using hard disk memory is that accessing content is slower and less responsive in comparison to solid state memory. Thus, users may encounter noticeable delays between the time they select play and the time music is heard or video seen, resulting potentially in an unsatisfactory user experience. Additionally, accessing content on the hard disk memory typically consumes more power than accessing content in solid state memory.

Designers of portable media devices are therefore faced with a number of competing design challenges, including maximizing battery life, providing a responsive user interface for a satisfactory user experience, and supporting extended periods of playback without accessing the hard disk memory. Designers have been generally resigned to satisfying one or possibly two of these challenges, while sacrificing the others. But, with each generation of devices, consumers demand more.

Accordingly, there continues to be a need for improved designs of portable media devices that strive to meet all of these challenges.

SUMMARY

A portable media device intelligently caches media based on device state. The portable media device has a hard disk memory to store the media (e.g., music, videos, movies, games, etc.) and a cache memory. When the device is in a state of user interaction (e.g., the user is navigating a menu or playlist, previewing media items such as songs or videos, and so forth), the portable media device caches many snippets of different media items stored on the disk memory. This enables the device to respond quickly to user input and provide instant playback as the user navigates items in the playlist. Conversely, when the device is in a playback state (e.g., the user has selected a specific media item and ceased interacting with the device for a period of time, or has locked the user interface), the portable media device caches as much contiguous data from the selected media item in the playlist as possible. With intelligent caching, the portable media device offers higher reliability and a more responsive user interface for an enhanced user experience while minimizing disk access, thereby conserving power and maximizing battery life.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to a portable media device with hard disk memory to store media (e.g., movies, videos, music, video games, etc.). To promote higher reliability and maximize battery life, the portable media device caches portions of the media in a cache memory. The portable media device is implemented with intelligent media caching that caches different media items depending upon device state. The choice of which media items to cache is made to anticipate those items that the user is most likely to request as a result of the device being in various operation states. For instance, the device may fill the cache memory with samples or previews of many media files when the device is in one state, and fill the cache memory with a single media file when the device is in another state.

In one described implementation, the device state is determined by how likely the user is expected to interact with the device. One proxy for discerning device state is to check whether the user has unlocked or locked the device's user interface (UI), although there are other ways to ascertain device state, as will be described below. When the user is likely to interact with the device (e.g., the UI is unlocked), the portable media device caches small snippets of media items in a playlist (e.g., small introduction portions of song or videos). This provides enhanced responsiveness to the user's navigation and selection entries, allowing the user to quickly preview choices.

When the user is unlikely to further interact with the device (e.g., the user has made a selection, locks the UI, and now wishes to listen or watch), the portable media device fills the cache memory with contiguous data of the selected media item. For instance, the device caches most or all of the currently selected title and if space is available, any portion of the next title on the playlist. This provides higher reliability as the playback is from the cache memory and additionally prevents any disruption to performance that might result from accidental contact with buttons on the device after play has begun. Accordingly, with intelligent caching, the device is able to satisfy competing goals of providing extended periods of playback with no disk access, maximizing battery life, and providing a responsive UI for an enhanced user experience.

Intelligent media caching may be implemented in any number of portable media devices. For discussion purposes, one exemplary configuration of a portable media device is described below. However, other configurations may be used, including portable digital assistants (PDAs), cellular phones, audio players, video players, handheld computers, notebook computers, digital cameras, laptop computers, and the like.

Portable Media Device

Figure 1:
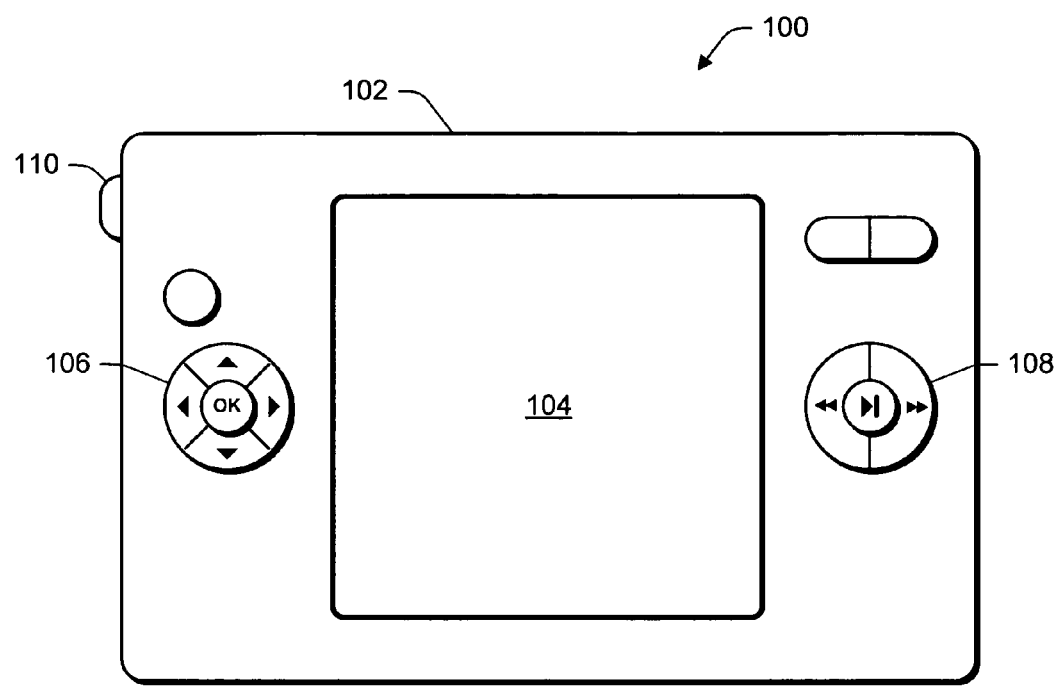
FIG. 1 illustrates a portable media device that implements intelligent media caching.

FIG. 1 shows a portable media device 100 configured as a Portable Media Center™ device supported by Microsoft Corporation. The device 100 is a multifunction device that is capable of playing music and videos, depicting digital photos, downloading content from the Internet, and the like.

Device 100 has a body or casing 102 and a display panel 104 mounted centrally of the casing 102. The display panel 104 is a flat panel, color display with sufficient resolution to depict digital images or motion video. The display panel may optionally be implemented with an overlaid touch screen to facilitate user input. The display panel may be implemented using different technologies, including LCD (liquid crystal display), OLED (organic light emitting diode), plasma, and DLP (digital light processing).

Function control buttons 106 are positioned left of the display panel 104 to support user control of the device 100. In the illustrated implementation, the control buttons 106 include four directional buttons and an entry key. Shuttle control buttons 108 are positioned right of the display panel 104 to facilitate media playback. One or more other buttons may also be provided to permit control of other functions, such as volume, brightness, contrast, and so forth. It is noted that the device 100 is just one exemplary implementation, and that other configurations and physical layouts, with more or less buttons and features, may be used.

The display panel 104 (and optional touch screen) and buttons 106 and 108 provide a user interface (UI) to facilitate user interaction with the device 100. The screen shows playlists and menu options, while the hard or soft-key buttons facilitate navigation of the menu, selection of items on the menu, and entry of control commands (e.g., shuttle controls, volume, etc.). A UI lock switch 110 may also be exposed on the device 100 to allow the user to lock the UI. Alternatively, the UI may be locked in response to other mechanical actions, such as closing a lid (not shown) on the device. When the UI is locked, any activation of the buttons 106 and 108 (and any soft keys if equipped with a touch screen) is ignored. Locking the UI helps prevent accidental button activations from effectuating unwanted changes. For instance, when the user is jogging, she might lock the UI to prevent unintentional play stoppage due to a button being jarred or jiggled. As another example, a student may start playing a music playlist and then want to put the device in his backpack for a walk to school. Locking the UI ensures that when the buttons are jostled in the backpack, any activation is ignored to prevent unwanted stoppage or skipping of titles.

The portable media device 100 may be characterized as having different device states. In one implementation, two device states are defined. A first or interactive device state occurs when the user is likely to interact with the device. The UI is active and ready to receive user input. In a second or inactive device state, the user is unlikely to be interacting with the device. The UI can be locked in this inactive device state to prevent accidental activation of the buttons.

Switching among device states can be achieved in a number of ways. One approach is to toggle between two device states using the mechanical UI lock switch 110. Pressing or sliding the switch 110 to a first operational position unlocks the UI, allowing the device to operate in the interactive state. Alternatively, moving the switch 110 to a second operational position locks the UI, transitioning the device to the inactive state. Apart from mechanical switches, another approach to changing device states is to allow user selection via soft-keys or other visual controls that are depicted as part of a graphical user interface on the display panel. Activity time-out may be another approach to change device states, where a period of inactivity triggers a transition from the interactive device state to the inactive device state.

Figure 2:
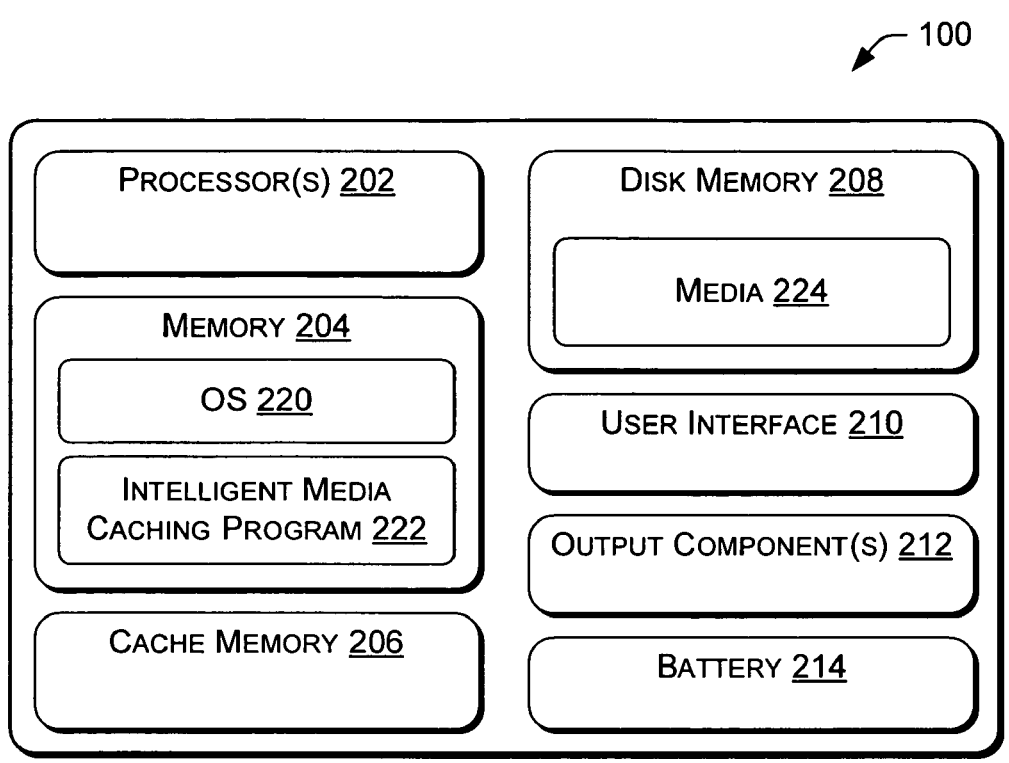
FIG. 2 is a block diagram illustrating selected components of the portable media device.

FIG. 2 shows selected components of the portable media device 100 in more detail. It includes one or more microcontrollers or processors 202, a program memory 204 (e.g., ROM, flash, NVRAM, etc.), a cache memory 206 (e.g., RAM), a hard disk memory 208, a user interface 210, output components 212, and a battery 214. The processor(s) 202 may include general-purpose processors and/or special-purpose processors, such as graphics processors. It is noted that other configurations are possible. For instance, the cache memory 206 may be included as part of program memory 204 (rather than separate as shown).

Instructions stored in program memory 204 are executed by the processor(s) 202. In this illustration, an operating system 220 and an intelligent media caching program 222 are stored in program memory 204 and executed on the processor(s) 202.

The battery 214 supplies power to the components of the media device 100. The battery 214 is preferably a rechargeable battery, such as a lithium-based battery.

The disk memory 208 stores media 224. There are many types of media, including video content (e.g., movies, TV programs, home videos, etc.), music content, digital photos, video games, and the like. The media 224 is stored as individual files that can be accessed and played by processor(s) 202. The disk memory 208 has sufficient capacity to store many media files, and has substantially more storage capacity than cache memory 206. For instance, in certain implementations, the disk memory 208 may hold a library of music titles or short video clips, whereas the cache memory 206 stores several seconds of a song or a video clip.

Cache memory 206 is sufficiently sized to hold snippets or portions of multiple media files 224, or contiguous media within one or more sequential files. During play, the processor 202 reads from the cache memory 206. As media is read out for processing, other media is read from the disk memory 208 and placed in the cache memory 206. In this manner, any disruption to disk operation caused by activity (e.g. jogging, skiing, etc.) will not affect performance.

The user interface (UI) 210 facilitates user interaction with the device. UI 210 includes a graphical user interface depicted on the display panel 104, and hard-key buttons 106-110 that allow user control. It might also include a touch screen overlaid on the display panel 104. With the UI 210, a user can browse through playlists of the media 224 stored in the disk memory 208 and select individual media items for playback. The output components 212 generate the audible sounds or visible images when the media items are played. These components might include, for example, audio outputs (e.g., speaker, speaker output port, etc.), display outputs, and/or the display panel 104.

The media caching program 222 intelligently caches different media items depending upon device state. In one implementation, the device 100 caches snippets of many media files when the UI is not locked and the user is likely to be navigating through the media files. The device caches as many media snippets as will fit in the cache memory 206. As the user browses various media items and chooses items for preview, the currently selected item begins playing almost instantly from the cache memory 206 in response to the user request. By caching media snippets while in this first device state, the device eliminates the noticeable delay time needed to access the disk memory. Thus, the device is more responsive to the user, resulting in an enriched user experience.

When the UI is locked and the device in an inactive state, the device 100 caches contiguous data from the media file currently selected on the playlist. The device fills the cache memory 206 with as much of the media file as possible. If space is still available, the device continues filling the cache memory 206 with sequential data from the next media file in the queue.

By intelligently caching different media items depending upon device state, the device provides extended play without accessing the disk. This promotes higher reliability of playback when the user is actively moving about. Additionally, with fewer disk accesses, battery life is maximized and the device is responsive to user navigation and previewing of media items.

While two device states are described in this implementation, more than two device states may be defined in different operating environments. In such implementations, different caching schemes are defined for each state. For instance, the device may be characterized as having three device states: a first state during user interaction, a second state during a lull in the interaction, and a third state when the user has ceased interacting with the device for the time being. These states may be associated with time intervals, where the first state involves a 30 second interval following any user input to the device, the second state is an interval between 30 and 90 seconds, and the third state begins 90 seconds after the last user interaction. In the first state, the device may cache snippets of many media items. In the second state, the device may cache more of the currently selected item, while also possibly caching larger portions of media items before and after the currently selected item. In the third state, the device caches as much of the currently selected item as possible.

Intelligent Caching

Figure 3:
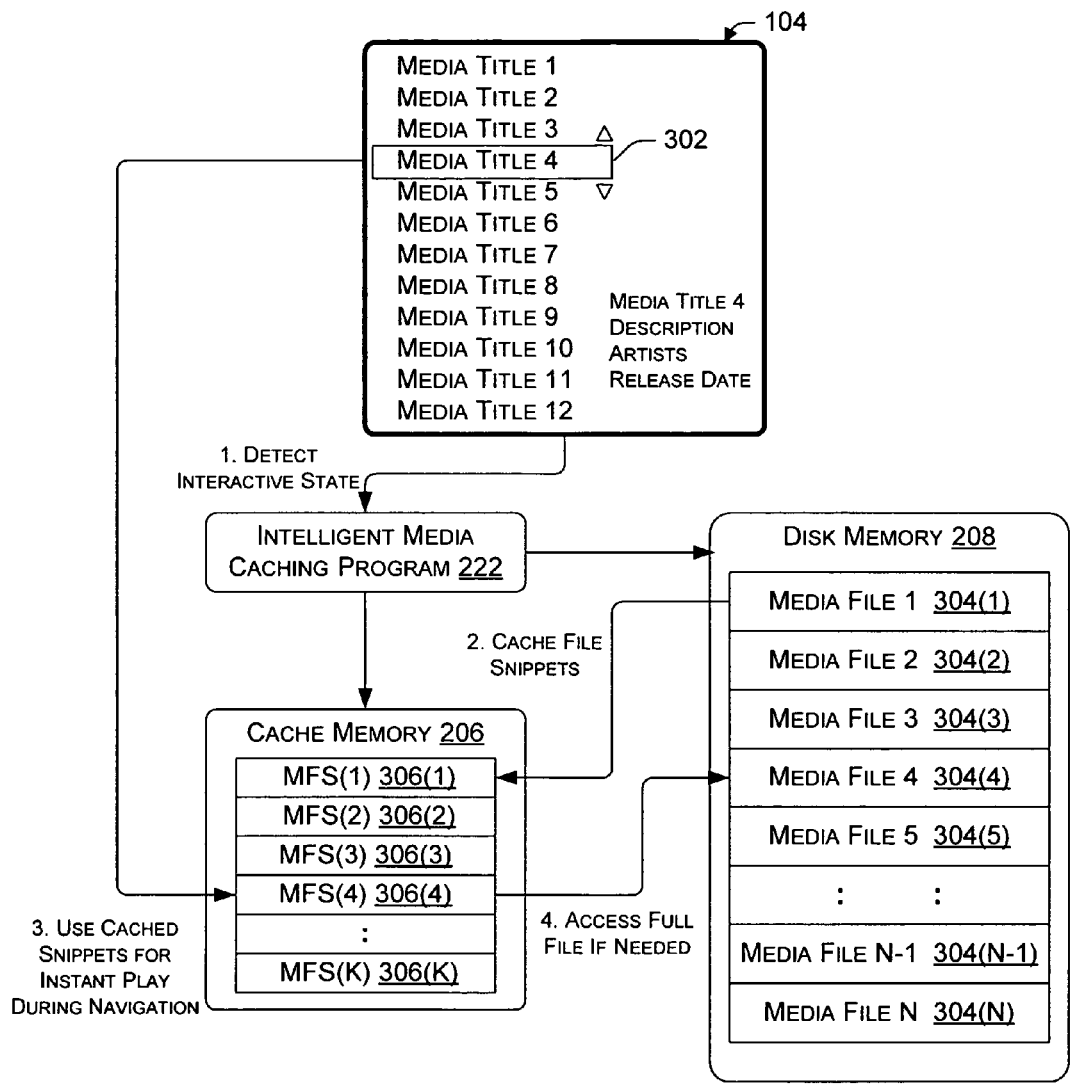
FIG. 3 illustrates an exemplary implementation of intelligent media caching when the device is in a first state.
Figure 4:
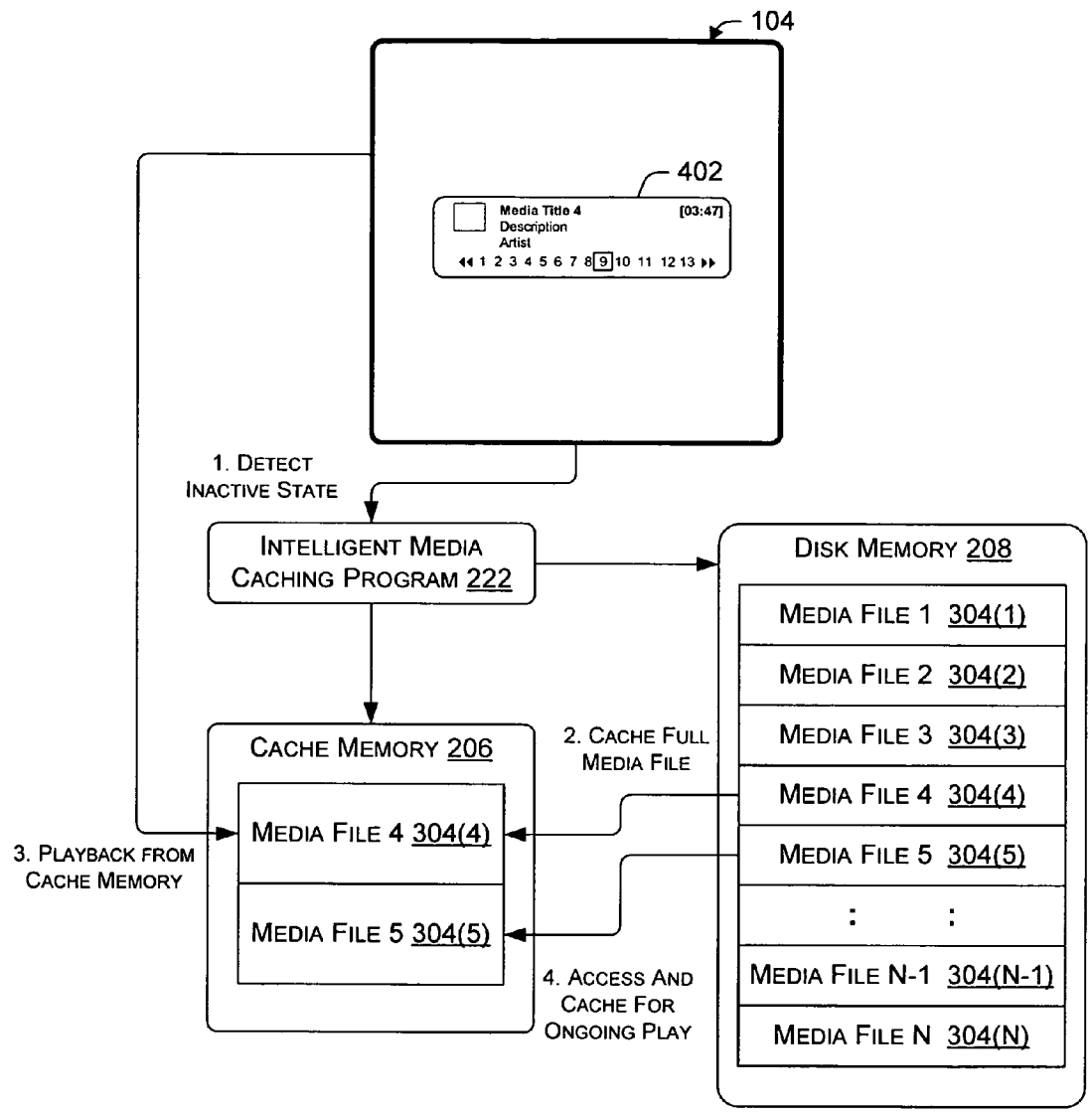
FIG. 4 illustrates an exemplary implementation of intelligent media caching when the device is in a second state.

FIGS. 3 and 4 illustrate an exemplary implementation of intelligent media caching for the portable media device depending upon the device's state. FIG. 3 shows one caching scheme when the device is in a first state and FIG. 4 shows another caching scheme when the device is in a second state.

In FIG. 3, the portable media device 100 is in a first or interactive state in which the user is currently interacting, or has recently interacted, with the device. This is exemplified by a playlist of media titles presented on display panel 104. The user navigates the playlist via a focus bar 302. Details of the media title that is highlighted by the focus bar 302 (e.g., media title 4) are presented in the lower, right-hand portion of the screen. Color graphics, video clips, and the like may further be depicted on the screen to enhance the user experience.

The intelligent media caching program 222 detects the interactive device state and caches short samples from as many media files as will fit in cache memory 206. In this example, there are N media files 304(1)-304(N) stored on disk memory 208 and the cache memory 206 has capacity to store K media file samples or snippets (MFS) 306(1)-306(K). As the user navigates the media list, corresponding media samples are pulled immediately from the cache memory 206 to provide instant playback to the user. In this manner, the user can browse and preview media items with the same rapid gratification as channel surfing on a television, or changing stations on a radio.

If the user decides to let a media title play on, exhausting the cached snippet, other portions of the file are accessed on the disk memory 208 to provide continuous and ongoing playback. Additionally, more of that particular media file may be cached to facilitate ongoing playback.

In FIG. 4, the portable media device 100 is transitioned to a second or inactive device state in which the user has ceased interacting with the device. This transition may be triggered by the user locking the UI via lock button 110, or as a result of an activity time-out, or by some other mechanism or software-based event. The change in device state is demonstrated by the change in screen display, where display panel 104 now depicts a feature box 402 that identifies a current media title being played. For instance, the media might be an audio song file, and hence the feature box 402 shows the song title, artist name, album title, length of song, and so forth.

The intelligent media caching program 222 detects the inactive device state and caches contiguous data from the selected media file in the cache memory 206. In this example, the user has selected media file 4. All or as much of media file 4 is read from disk memory 208 and stored in cache memory 206. If the media file is smaller than the capacity of the cache, the media caching program 222 may cache the beginning portion of the next media file that would follow sequentially absent user intervention. Here, part or all of media file 5 is also placed into cache memory 206. During playback, the media file 4 is played from the cache memory 206, followed by media file 5. In this manner, the device limits the number of disk accesses to playback the media title. As data is read from the cache memory, the device continues to cache the next contiguous portions of the media files to replenish the cache. By reading from the cache memory 206, the device 100 prevents disk access problems caused by activity from disrupting performance of the playback.

Figure 5:
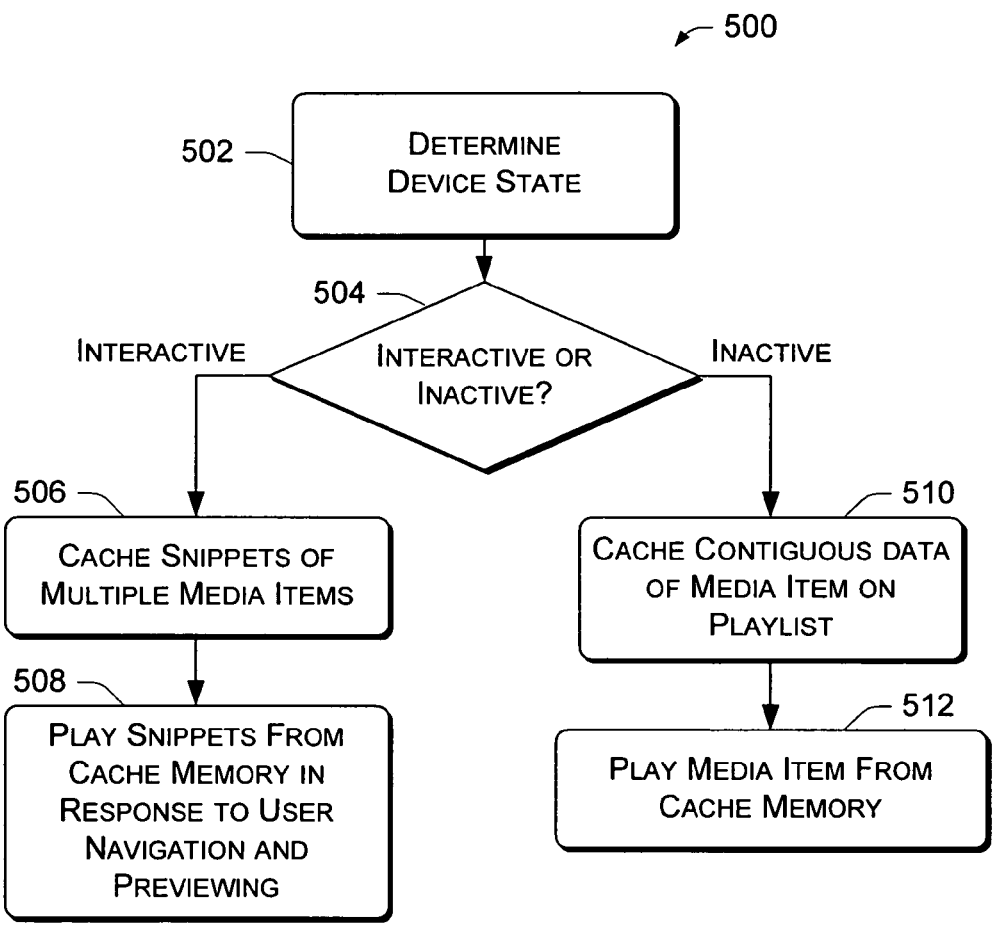
FIG. 5 is a flow diagram of a process for intelligently caching media according to device state.

FIG. 5 shows a process 500 for intelligently caching media according to device state. The process 500 is illustrated as a collection of blocks in a logical flow graph, which represent a sequence of operations that can be implemented in hardware, software, or a combination thereof. In the context of software, the blocks represent computer instructions that, when executed by one or more processors, perform the recited operations.

For discussion purposes, the process 500 is described with reference to the portable media device 100 and architecture shown in FIG. 1. It is noted that the process 500 may be implemented by other devices and architectures.

At block 502, the device state is determined. In one implementation, the intelligent media caching program 222 ascertains whether the UI is locked or unlocked. This may be done by checking the position of lock button 110. If unlocked, the device is in a first or interactive state; whereas if locked, the device is in a second or inactive state. Alternatively, the device state may be dictated by an activity time-out. For instance, the device may be deemed to have switched from the interactive state to the inactive state when a preset time period (e.g., 90 seconds) elapses without user interaction.

If the device is in an interactive state (i.e., the "Interactive" branch from block 504), short samples of many media items are cached (block 506). The intelligent media caching program 222 extracts portions of multiple media files 304 in the disk memory 208 and stores them in the cache memory 206. This is illustrated in FIG. 3, for example, where K media file samples 306(1)-306(K) are read from disk memory 208 and stored in the cache memory 206. While the user is interacting with the device (e.g., navigating menus, previewing selections, etc.), the device plays the media snippets from the cache memory 206 to provide instant playback to the user (block 508).

On the other hand, if the device is in an inactive state (i.e., the "Inactive" branch from block 504), contiguous data from a media file on the playlist is cached (block 510). The intelligent media caching program 222 fills the cache memory 206 with as much contiguous data from a current media file as the memory can hold. This is illustrated in FIG. 4, for example, where all or most of at least one media file 4, and at least part of the next media file 5, are read from the disk memory 208 and stored in the cache memory 206. The device plays the data from the cache memory 206 as next contiguous data portions are read from the disk memory to replenish the cache (block 512).

The above process 500 is described in the context of two device states: interactive and inactive. However, the device may be configured with more than two device states. With each device state, a corresponding caching heuristic may be defined. In this manner, as the portable media device is operated in different states, different media items are cached in the cache memory to provide a responsive user interface for a better user experience, higher reliability, maximize battery life, and support extended periods of playback without accessing the hard disk memory.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A portable media device comprising:
a disk memory to locally store media desired for playback by a user;
a cache memory;
a processor coupled to the disk memory and the cache memory; and
a media caching program executable on the processor to adopt different caching policies in caching media items stored in the disk memory depending upon a determination by the portable media device in response to a user input indicative of whether the user is likely to be interacting with the portable media device, wherein:
the portable media device comprises a first state where the portable media device determines that the user is likely to be interacting with the portable media device and a second state where the portable media device determines that the user is unlikely to be interacting with the portable device; and
the media caching program caches portions of multiple media files in the cache memory if the portable media device determines that it is at the first state and caches as much of contiguous data from at least one media file in the cache memory as possible if the portable media device determines that it is at the second state.

2. A portable media device as recited in claim 1, wherein the media comprises one of audio data, video data, and video game data.

3. A portable media device as recited in claim 1, wherein the portable media device determines that it is in the second state after a time period has lapsed since the user last interacted with the portable media.

4. A portable media device as recited in claim 1, further comprising a user interface to facilitate the user's interaction with the portable media device, wherein the portable media device is set to the first state of the portable media device when the user interface is unlocked and is set to the second state of the portable media device when the user interface is locked.

5. A portable media device as recited in claim 1, further comprising a user interface to facilitate navigation of a playlist and selection of a particular media item from the playlist, wherein the media caching program caches snippets of multiple media items in the playlist when the user is navigating the playlist and caches the particular media item when the user ceases navigation of the playlist and selects the particular media item.

6. A portable media device as recited in claim 1, embodied, as a portable device selected from a group of portable devices comprising a cellular phone, a portable digital assistant, an audio player, a digital video player, and a handheld computing device.

7. A portable media device comprising:
a disk memory to locally store multiple media files that are desired for playback by a user;
a cache memory;
user interface to facilitate navigation and playback of the media flies stored in the disk memory, the user interface being alternately locked and unlocked to prevent unintended user interaction with the portable media device;
a processor coupled to the disk memory, to cache memory, and the user interface; and
a media caching program executable on the processor to cache portions of multiple media files in to cache memory when the user interface is unlocked and to cache contiguous data from at least one media file in to cache memory when to user interface is locked.

8. A portable media device as recited in claim 7, further comprising a mechanism to alternately lock and unlock the user interface.

9. A portable media device as recited in claim 7, wherein, in an. event the cache memory has unused storage capacity after the at least one media file is cached, the media caching program caches contiguous data of a next media file following said at least one media file.

10. A portable media device as recited in claim 7, wherein, in response to navigation of the media files, the processor plays the cached portions to allow the user to quickly preview the media files.

11. A portable media device as recited in claim 7, wherein the processor plays the contiguous data from the cache memory while concurrently caching subsequent data from said at least one media file in the cache memory.

12. A computer-readable media storing computer-executable instructions that, when executed by a processor, perform acts comprising:
determining a current state of a portable media device based on a user input indicative of whether or not a user is likely to be interacting with the portable media device, wherein:
the state of the portable media device comprises:
a first state that is associated with user interaction with the portable media device; and
a second state that is associated with lack of user interaction with the portable media device; and
the user input comprises:
a lock action and an unlock action facilitating, via a user interface of the portable media deice, the user interacting with the portable media device such that the first state is determined when the unlock action is performed and the second state is determined when the lock action is performed;

caching portions of multiple different media items when the portable media device determines that it is in the first state; and caching contiguous data from a particular media item when the portable media device determines that it is in the second state.

13. A computer-readable media as recited in claim 12, wherein the determining comprises:

monitoring how much time has lapsed since the user last interacted with the portable media device; and identifying the state of the portable media device by comparing the lapsed time against a predetermined threshold.

14. A computer-readable media as recited in claim 12, wherein the determining comprises:

detecting a software generated event that specifies a transition between the first and second states; and identifying the state of the portable media device on the basis of the detected software generated event.

15. A portable media device comprising:

a disk memory to store the media items;

a cache memory;

the computer-readable media as recited in claim 12; and a processor to execute the instructions stored on the computer readable media.

\* \* \* \* \*